US012670298B2

(12) United States Patent
Saito

(10) Patent No.: US 12,670,298 B2
(45) Date of Patent: Jun. 30, 2026

(54) FOLD LINE DESIGN METHOD, DESIGN DEVICE, AND NON-TRANSITORY COMPUTER READABLE MEDIUM

(71) Applicant: KYUSHU UNIVERSITY, NATIONAL UNIVERSITY CORPORATION, Fukuoka (JP)

(72) Inventor: Kazuya Saito, Fukuoka (JP)

(73) Assignee: KYUSHU UNIVERSITY, NATIONAL UNIVERSITY CORPORATION, Fukuoka (JP)

( * ) Notice: Subject to any disclaimer, the term of this patent is extended or adjusted under 35 U.S.C. 154(b) by 891 days.

(21) Appl. No.: 18/058,174

(22) Filed: Nov. 22, 2022

(65) Prior Publication Data

US 2023/0085804 A1 Mar. 23, 2023

Related U.S. Application Data

(63) Continuation of application No. PCT/JP2021/019564, filed on May 24, 2021.

(30) Foreign Application Priority Data

May 25, 2020 (JP) ................................. 2020-090374

(51) Int. Cl.
*B31D 5/04* (2017.01)
*G06F 30/17* (2020.01)
*G06F 30/20* (2020.01)
*G06F 113/24* (2020.01)

(52) U.S. Cl.
CPC .............. *G06F 30/17* (2020.01); *G06F 30/20* (2020.01); *G06F 2113/24* (2020.01)

(58) Field of Classification Search
CPC ...... G06F 30/27; G06F 30/28; G06F 2111/10; G06F 2113/08
See application file for complete search history.

(56) References Cited

U.S. PATENT DOCUMENTS 3,010,372 A * 11/1961 Lanford ................. B64G 99/00
493/405

FOREIGN PATENT DOCUMENTS

| JP | H08-002500 A | 1/1996 |
| JP | 2003-061725 A | 3/2003 |
| JP | 2017-020620 A | 1/2017 |

(Continued)

OTHER PUBLICATIONS

Lang et al., Single Degree-of-Freedom Rigidly Foldable Cut Origami Flashers (Year: 2016).*

(Continued)

*Primary Examiner* — Rehana Perveen
*Assistant Examiner* — John David Hagler
(74) *Attorney, Agent, or Firm* — Studebaker Brackett PLLC

(57) ABSTRACT

A fold line design method is a method for folding a target member. The method includes: setting a ribbase on a plane along a main surface of the target member; designing a plurality of first fold lines each of which extend radially from the ribbase as a starting point, and in which a mountain fold line and a valley fold line are alternately disposed; and designing a plurality of second fold lines which respectively connect the first fold lines adjacent to each other among the plurality of first fold lines, and constitute one continuous fold line.

9 Claims, 15 Drawing Sheets

(56) References Cited

FOREIGN PATENT DOCUMENTS

| | | | |
|---|---|---|---|
| JP | 2018-172931 A | 11/2018 |
| WO | 01/081821 A1 | 11/2001 |

OTHER PUBLICATIONS

Guest et al., Inextensional Wrapping of Flat Membranes (Year: 1992).*

Tsukahara et al., Designing of self-deploying origami structures using geometrically misaligned crease patterns (Year: 2015).*

Saito et al., Manufacture of Arbitrary Cross-Section Composite Honeycomb Cores Based on Origami Techniques (Year: 2013).*

Fumiko Sugiyama et al., "Development of folding method of spherical membrane in both radial and axial directions" Bulletin of the JSME, Transactions of the JSME (in Japanese), [Online], vol. 80, No. 814, Jan. 1, 2014, pp. 1-10, XP055879642; re-submitted with additional English translation.

The extended European search report issued by the European Patent Office on Jun. 10, 2024, which corresponds to European Patent Application No. 21813326.2-1218 and is related to U.S. Appl. No. 18/058,174.

International Preliminary Report on Patentability (Chapter I) and Written Opinion of the International Searching Authority issued in PCT/JP2021/019564; Notification mailed Dec. 8, 2022.

International Search Report issued in PCT/JP2021/019564; mailed Aug. 17, 2021.

Fumiko Sugiyama et al. "Development of Folding Method of Spherical Membrane in Both Radial and Axial Directions" Transactions of the JSME, Jun. 25, 2014, pp. 1-10, vol. 80, No. 814, pDRO170.

* cited by examiner

MN

X

L'2    L'1

O

A

X

Le

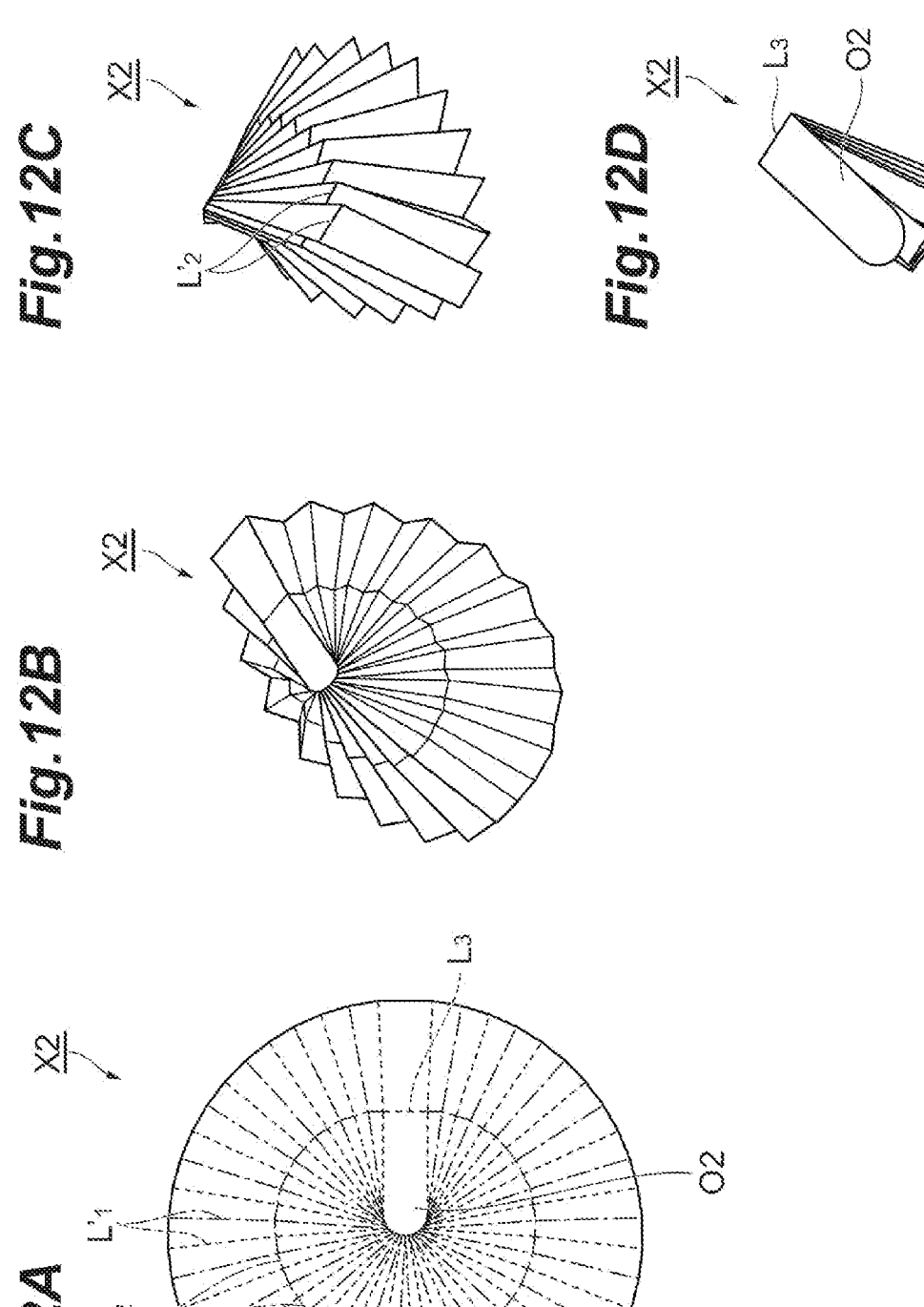

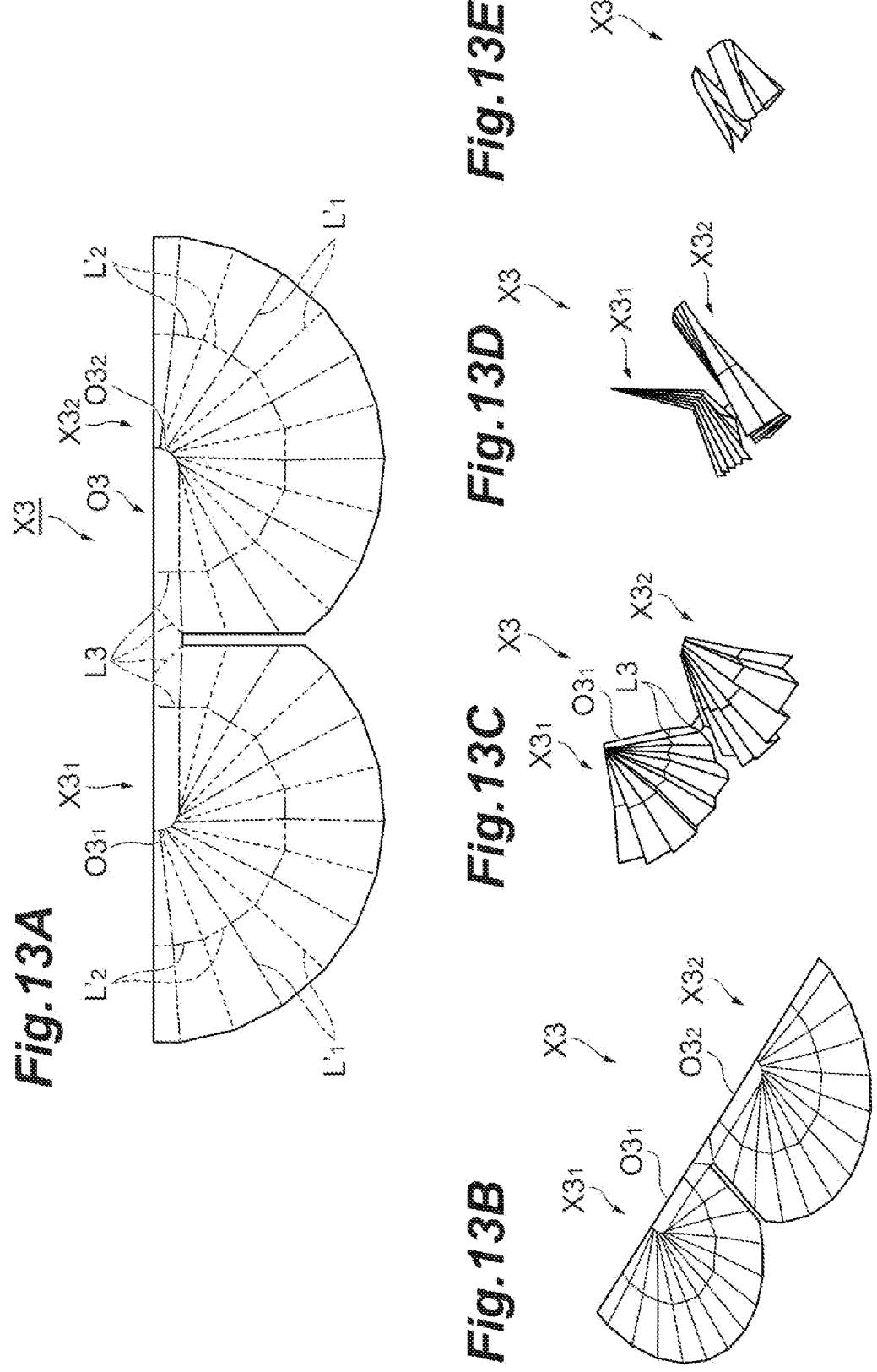

FOLD LINE DESIGN METHOD, DESIGN DEVICE, AND NON-TRANSITORY COMPUTER READABLE MEDIUM

CROSS-REFERENCE TO RELATED APPLICATIONS

This application is a continuation application of PCT Application No. PCT/JP2021/019564 filed on May 24, 2021, which claims the benefit of priority from Japanese Patent Application No. 2020-090374, filed on May 25, 2020, the entire contents of which are incorporated herein by reference.

FIELD

The present disclosure relates a fold line design method, a design device, and a non-transitory computer readable medium.

BACKGROUND

As an example of a sheet-shaped member that is compactly folded, there is known a method of alternately repeating mountain fold and valley fold like a fan. Japanese Unexamined Patent Publication No. 2003-61725 discloses a fan having a structure capable of being folded in a horizontal direction and a vertical direction.

SUMMARY

Disclosed herein is an example fold line design method is a method of designing a fold line for folding a target member. The method includes: setting a ribbase on a plane along a main surface of the target member; designing a plurality of first fold lines each of which extend radially from the ribbase as a starting point, and in which a mountain fold line and a valley fold line are alternately disposed; and designing a plurality of second fold lines which respectively connect the first fold lines adjacent to each other among the plurality of first fold lines, and constitute one continuous fold line.

BRIEF DESCRIPTION OF THE DRAWINGS

FIG. 12A to FIG. 12D are views describing still another example of sheet folding.

FIG. 13A to FIG. 13E are views describing a further example of sheet folding.

DETAILED DESCRIPTION

Figure 1:
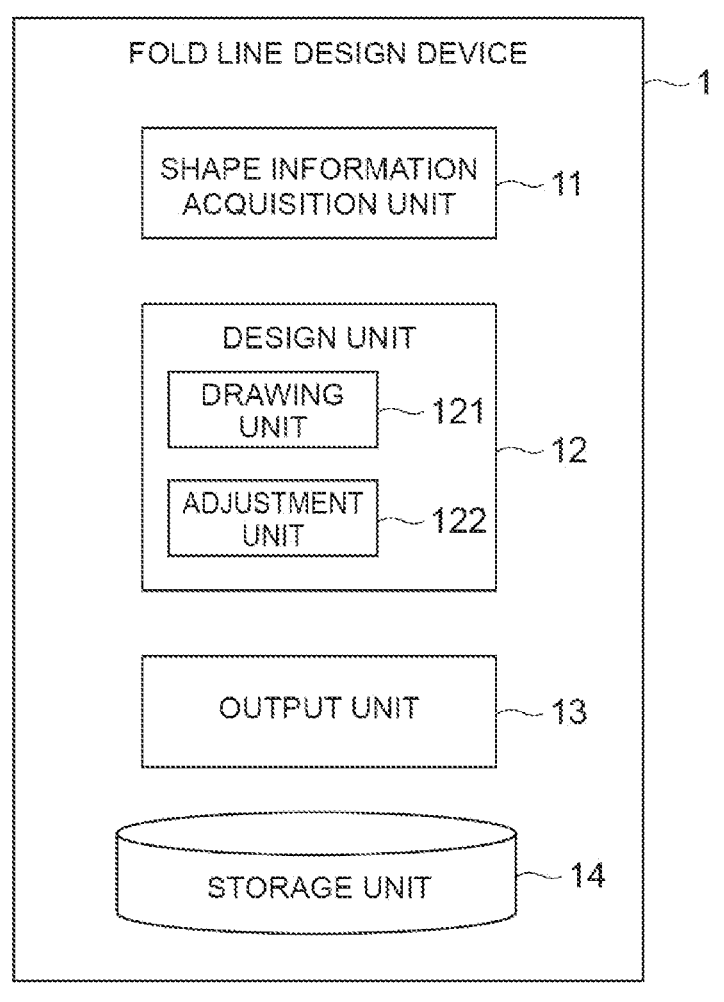
FIG. 1 is a view describing an example configuration of a fold line design device.

In the following description, the same reference numerals will be used for the same or functionally identical elements, with redundant description omitted.

In the following examples, description will be given of a method of designing a fold line for folding a member that becomes a target (hereinafter, may be referred to as "target member"), a device relating to a design of the fold line, a program for carrying out the design of the fold line. The target member that becomes a fold line design target is a member having foldable structure. Examples of the target member include a sheet-shaped member. The sheet-shaped member is a member including a pair of main surfaces, a material and a size thereof are not particularly limited, and is applicable to, for example, construction, an aerospace, mechanical engineering, a daily-use article, and the like. Note that, the target member is not limited to the sheet-shaped member. For example, a member which is an assembly of members constituting the same plane and in which the plane can be made compact through folding can also be set as the target member. For example, a frame structure constituted in the same plane, or the like can be set as the target member. The "plane" stated here is not limited to a so-called flat plane, includes a plane having some unevenness, and also includes a case where an integrated plane is considered to be formed. In addition, the target member may be a member, in which any one plane among a plurality of planes can be made compact through folding, as an assembly of members constituting a plurality of planes.

In addition, in the fold line design method described in the following examples, a base (a ribbase to be described later) serving as a folding reference is provided near the center of a target member, schematic fan type folding is performed by repeating mountain fold and valley fold along radial fold lines extending from the base, and compact folding is performed in a direction intersecting a mountain fold line and a valley fold line so that a size of a main surface of the target member in a plan view decreases. Accordingly, in the target member, it can be said that a region that becomes a target for which folding described in the following examples is performed is a shape for which the base is easily set in the center, for example, like a circular shape or a fan shape.

In the following examples, first, a schematic configuration of a device relating to the design of a fold line relating to a target member and a program for designing the fold line will be described, and then a fold line design method will be described.

Fold Line Design Device

FIG. 1 is a view describing an example configuration of a fold line design device. The fold line design device 1 is the target device configured to design a fold line for folding a member on the basis of information of the target member. In addition, when there is a demand for compact folding of the target member, the fold line design device 1 is applicable.

The fold line design device 1 includes a shape information acquisition unit 11, a design unit 12, an output unit 13, and a storage unit 14.

The shape information acquisition unit 11 has a function of acquiring information relating to a shape of the target member that becomes the fold line design target. Shape information acquired by the shape information acquisition unit 11 is information (including a size of the target member or the like) that specifies a shape of a region that is a folding target in the target member. The region that is the folding target is a region that becomes a fold line design target. In addition, as information relating to the region that is the folding target of the target member, another information required for fold line design exists. Specific examples thereof include the number of apex angles or frames of a sector for determining the number and arrangement of mountain fold lines and valley fold lines when folding, a target size after folding, a radius of a ribbase to be described later, and the like. The information acquired by the shape information acquisition unit 11 is not limited to the exemplified information. When acquiring information relating to the region that becomes the fold line design target, the shape information acquisition unit 11 can recognize a shape and a size of the region, and the like.

The design unit 12 designs the fold line on the basis of the information acquired by the shape information acquisition unit 11. The design unit 12 includes a drawing unit 121 and an adjustment unit 122. The drawing unit 121 has a function of drawing the fold line on the basis of a method to be described later. In addition, the adjustment unit 122 has a function of adjusting the fold line by a method to be described later. Examples of the adjustment by the adjustment unit 122 may include a configuration in which adjustment is performed while confirming an actually folded state along a fold line drawn by the drawing unit 121 through simulation. A detailed procedure relating to the fold line design by the design unit 12 will be described later.

The output unit 13 has a function of outputting a result that is designed in the design unit 12. Examples of an output method includes a method of outputting data that specifies a position of the fold line and a folding direction, or the like. In addition, "designed result" output from the output unit 13 includes various pieces of data including the fold line, various pieces of data representing a result obtained by folding the target member by using the fold line, or the like. For example, a development figure (a plan view of the target member) on which the fold line is described, three-dimensional data representing a shape after folding, or the like may be output from the output unit 13. In this manner, "outputting of a designed result" from the output unit 13 is not limited to outputting of an object obtained as a result of designing as a single object, various pieces of data (for example, three-dimensional shape data such as CAD data for output in a 3D printer, or the like) obtained from the result may be included.

The storage unit 14 has a function of storing various pieces of information that is used in the fold line design device 1. As an example, information acquired by the shape information acquisition unit 11, information corresponding to a result designed by the design unit 12 (a design result of the fold line), and the like may be stored in the storage unit 14.

Fold Line Design Program

Figure 2:
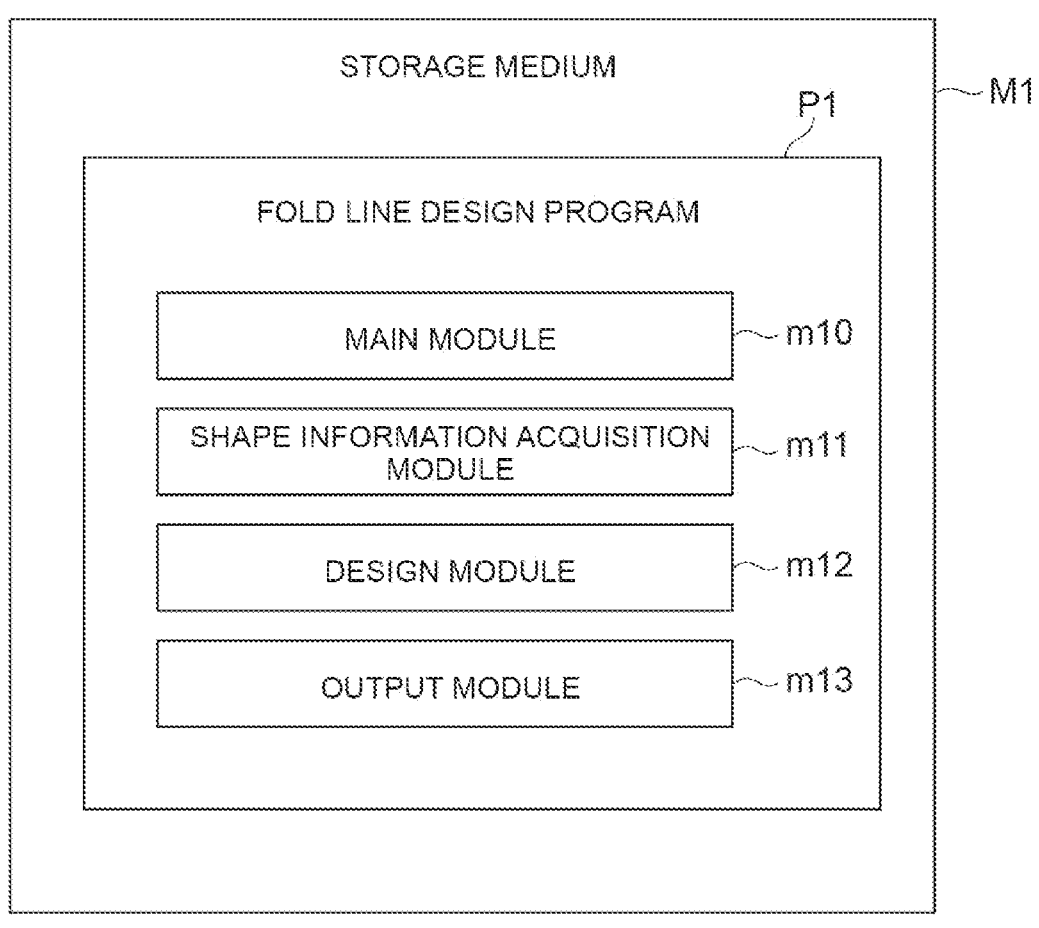
FIG. 2 is a view illustrating an example configuration of a fold line design program.

Description will be given of an information processing program for causing a computer to function as the fold line design device 1. FIG. 2 is a view illustrating an example configuration of a fold line design program P1.

The fold line design program P1 includes a main module m10 that collectively controls the above-described process in the fold line design device 1, a shape information acquisition module m11, a design module m12, and an output module m13. In addition, respective functions for the shape information acquisition unit 11, the design unit 12, and the output unit 13 in the fold line design device 1 are realized by the modules m11 to m13. Note that, the fold line design program P1 may be transmitted through a transmission medium such as a communication line, or may be stored in a recording medium M1 as illustrated in FIG. 2.

Hardware Configuration

The fold line design device 1 is realized by an arbitrary combination of hardware and/or software. Respective functions may be realized by one device that is physically and/or logically coupled, or by two or more devices which are physically and/or logically separated and are directly and/or indirectly connected.

Figure 3:
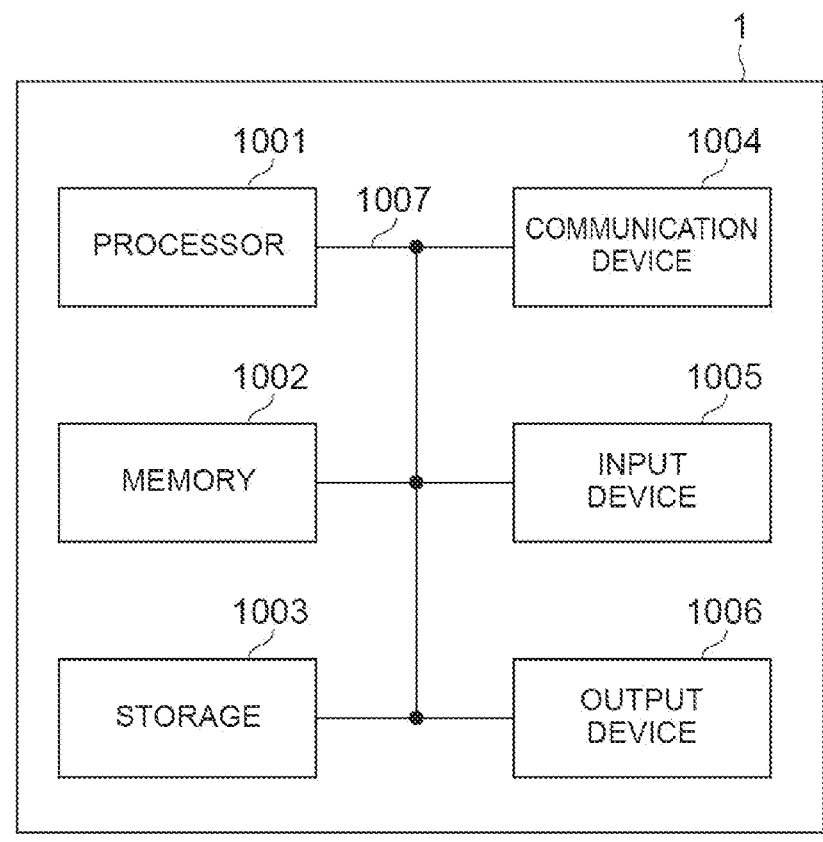
FIG. 3 is a view illustrating an example hardware configuration of the fold line design device.
Figure 4:
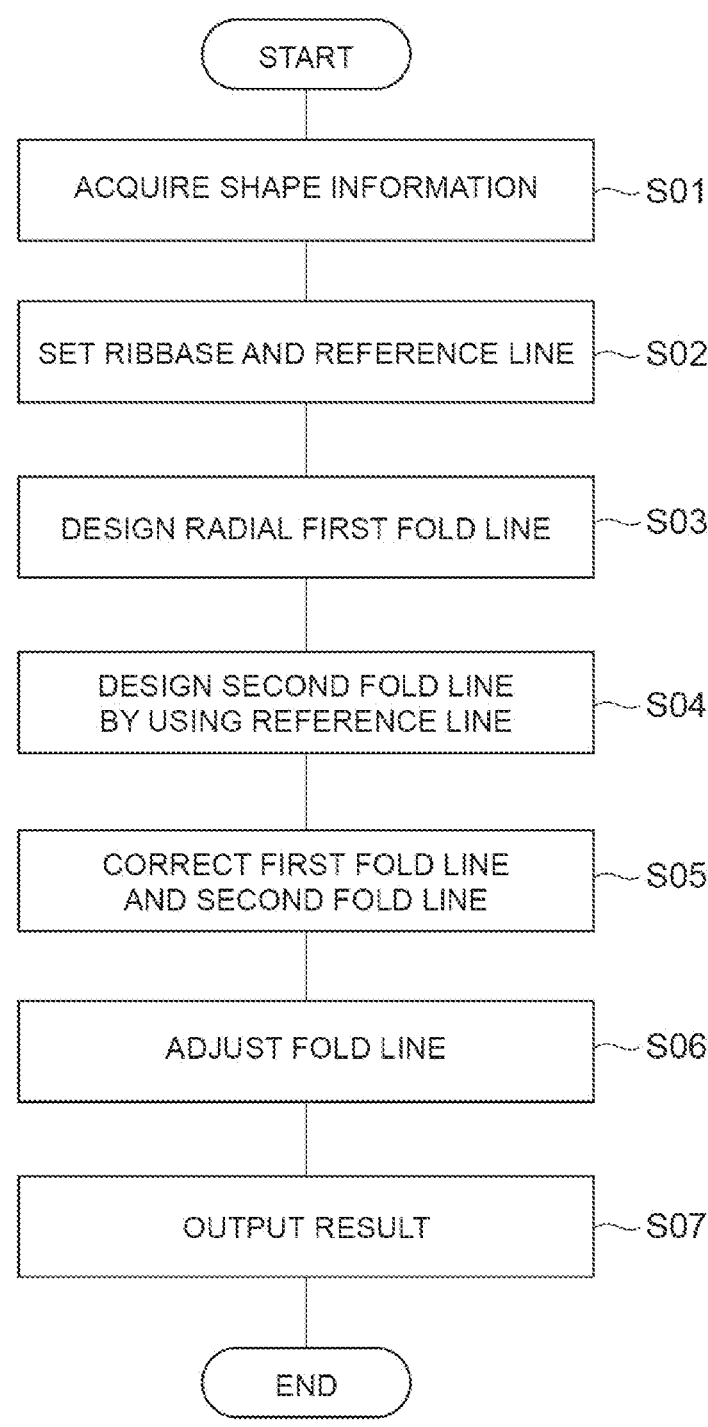
FIG. 4 is a flowchart describing an example fold line design method.

FIG. 3 is a view illustrating an example hardware configuration of the fold line design device 1. The fold line design device 1 may be physically configured as a computer device including a processor 1001, a memory 1002, a storage 1003, a communication device 1004, an input device 1005, an output device 1006, a bus 1007, and the like.

The respective functions in the fold line design device 1 are realized as follows. Specifically, by loading predetermined software (program) on hardware such as the processor 1001 and the memory 1002, the processor 1001 performs arithmetic operation, and controls communication by the communication device 1004, and read-out and/or writing of data in the memory 1002 and the storage 1003.

For example, the processor 1001 controls the entirety of the computer by causing an operating system to operate. The processor 1001 may be constituted by a central processing unit (CPU). For example, various processes of the fold line design device 1, and the like may be realized by the processor 1001. In addition, the processor 1001 reads out a program (program code), a software module, or data from the storage 1003 and/or the communication device 1004 to the memory 1002, and executes various processes in accordance with the program, the software module, or the data. A function of executing various processes of the fold line design device 1 may be realized by a control program that is stored in the memory 1002 and is operated by the processor 1001. This is also true of other functional blocks. On the other hand, various processes in the fold line design device 1 may be executed by one processor 1001 or may also be executed by simultaneously or sequentially by two or more processor 1001.

The memory 1002 is a computer-readable recording medium, and may be constituted, for example, by at least one of a read only memory (ROM), an erasable programmable ROM (EPROM), an electrically erasable programmable ROM (EEPROM), a random access memory (RAM), and the like.

The storage 1003 is a computer-readable recording medium. For example, the storage 1003 may be constituted by at least one of a hard disk drive, a flexible disk, a magneto-optical disc, and an optical disc such as a compact disc ROM (CD-ROM), and the like. The above-described storage medium may be, for example, a database, a server, or other suitable media which include the memory 1002 and/or the storage 1003.

The communication device 1004 is a device for performing communication between computers through wired and/ or wireless network. For example, a part of the various processes of the fold line design device 1 may be realized by the communication device 1004.

The input device 1005 is an input device (for example, a keyboard or the like) that accepts input from the outside. The output device 1006 is an output device (for example, a display or the like) that performs output to the outside.

The respective devices are connected a bus 1007 for information communication. The bus 1007 may be constituted by a single bus, or may be constituted by buses different between devices.

Fold Line Design Method

Next, a fold line design method in the fold line design device 1 will be described with reference to FIG. 4, FIG. 5A, FIG. 5B, FIG. 6, FIG. 7 and FIG. 8A to FIG. 8C, and a detained design method will be described. Here, it is assumed that a target member is a sheet X, and description will be given of a method of designing a fold line for folding the sheet X.

The fold line for folding the sheet X includes a ribbase, a plurality of first fold lines (radial fold lines) extending radially, and a plurality of second fold lines (ring fold lines) intersecting the first fold lines. The first fold lines are fold lines extending radially with respect to the ribbase, and are fold lines for folding the sheet X by alternately repeating mountain fold and valley fold. The first fold lines can be referred to as an assembly of a plurality of fold lines (a plurality of mountain fold line and a plurality of valley fold lines) starting from the ribbase. In addition, the second fold lines are fold lines for making the sheet X, for which the mountain fold and the valley fold are alternatively repeated along the radial first fold lines, compact by folding the sheet X in a direction intersecting the first fold lines, and the plurality of second fold lines continuously form one fond line. In addition, the ribbase is a portion that becomes a reference for designing the fold line, and may be provided on a part of the sheet or may be virtually provided out of the sheet. Hereinafter, a specific procedure for designing the fold lines will be described.

First, the fold line design device 1 executes step S01 (shape information acquisition step). In step S01, the fold line design device 1 acquires information relating to a shape of a sheet-shaped member that becomes a fold line design target in the shape information acquisition unit 11. A providing source of the information acquired in the shape information acquisition unit 11 is not particularly limited. For example, the shape information acquisition unit 11 may acquire information provided from an outer device, an outer storage medium, or the like different from the fold line design device 1, or may acquire information that is directly input to the fold line design device 1 by a user of the device.

Next, in the fold line design device 1, step S02 to step S05 (design steps) are executed. Step S02 to step S05 are processes performed in the drawing unit 121 of the design unit 12, and are steps relating to a specific procedure relating to the fold line design.

First, in step S02, in the sheet X that becomes a folding target, a ribbase and a reference line which become the reference of the fold line are set. Next, in step S03, first fold lines (radial folding lines) which become radial fold lines are designed on the basis of the ribbase. These will be described with reference to FIG. 5A and FIG. 5B.

Figure 5A:
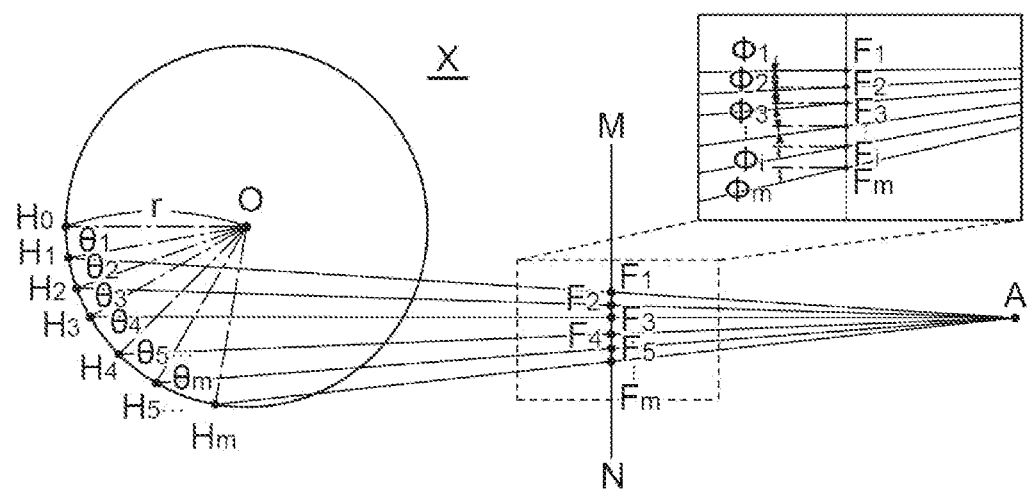
FIG. 5A and FIG. 5B are views describing the example fold line design method.

First, as illustrated in FIG. 5A, a reference circle O serving as the ribbase within a fold line design target region is set. The reference circle O can be provided near the center of the design target region as an example of a folding reference of the sheet X. However, the position of the reference circle O is not limited to the center of the design target region. This will be described later. Note that, here, description will be given of a case where the ribbase has a circular shape, but the ribbase includes a line segment having a certain length for specifying a location that becomes a reference when designing the fold line, and a shape thereof is not particularly limited. As an example, various annular ribbases such as a precise circle shape and an ellipse shape can be set. The ribbase is a region that becomes a reference for designing first fold lines to be described later, and is determined so that starting points $H_0$ to $H_m$ of fold lines to be described later can be set.

In addition, a reference point A and a reference line MN are set in correspondence with the reference circle O. The reference point A is used as a reference point for designing the first fold lines to be described later. The reference point A can be provided on an outer side of the ribbase, but a location thereof is not particularly limited. In addition, as illustrated in FIG. 5A, the reference line MN set as a straight line that can be set between the reference circle O and the reference point A, or on the reference point A. In addition, a direction in which the reference line MN extends is set to a direction that partitions the reference point A and the reference circle O (direction intersecting a line that connects the reference point A and the reference circle O) as an example, but there is no limitation to the direction. In addition, in some examples, the reference point A is set to one site, but a plurality of reference points may be set. At least, the reference line MN may be set so that the following intersection points $F_1$ to $F_m$ can be set on the reference line MN. Accordingly, for example, the intersection points $F_1$ to $F_m$ may be determined by a method of directly designating intersection points $F_1$ to $F_m$ to be described later on the reference line MN without setting the reference point A in advance.

Next, the starting points $H_0$ to $H_m$ of the fold lines are set for designing the first fold lines shown in step S03. The starting points $H_0$ to $H_m$ are provided on the reference circle O (ribbase). As an example, in the example illustrated in FIG. 5A, first, the starting point $H_0$ is set, and then the starting point $H_1$ is set with respect to the starting point $H_0$ so that an arc of the reference circle O has a circumferential angle $\theta_1$. Similarly, the starting point $H_2$ is set with respect to the starting point $H_1$ to have circumferential angle $\theta_2$. This work is repeated to define positions of the starting points $H_0$ to $H_m$.

At this time, the starting points $H_1$ to $H_m$ are connected to the reference point A. In addition, intersection points between a line connecting the starting points $H_1$ to $H_m$ and the reference point A and the reference line MN are set as the intersection points $F_1$ to $F_m$. Line segment $H_iF_i$ (i=1 to m) connecting the intersection points and the starting points correspond to a direction of a rib when folding the sheet X on the basis of fold lines. Note that, as described above, the intersection points $F_1$ to $F_m$ may be designed without using the reference point A. A position of each of the intersection points $F_1$ to $F_m$ has an influence on arrangement, an angle, and the like of a designed fold line, and thus the position is one of parameters which become a target of adjustment (step S06 to be described later) after performing designing at once.

Figure 5B:
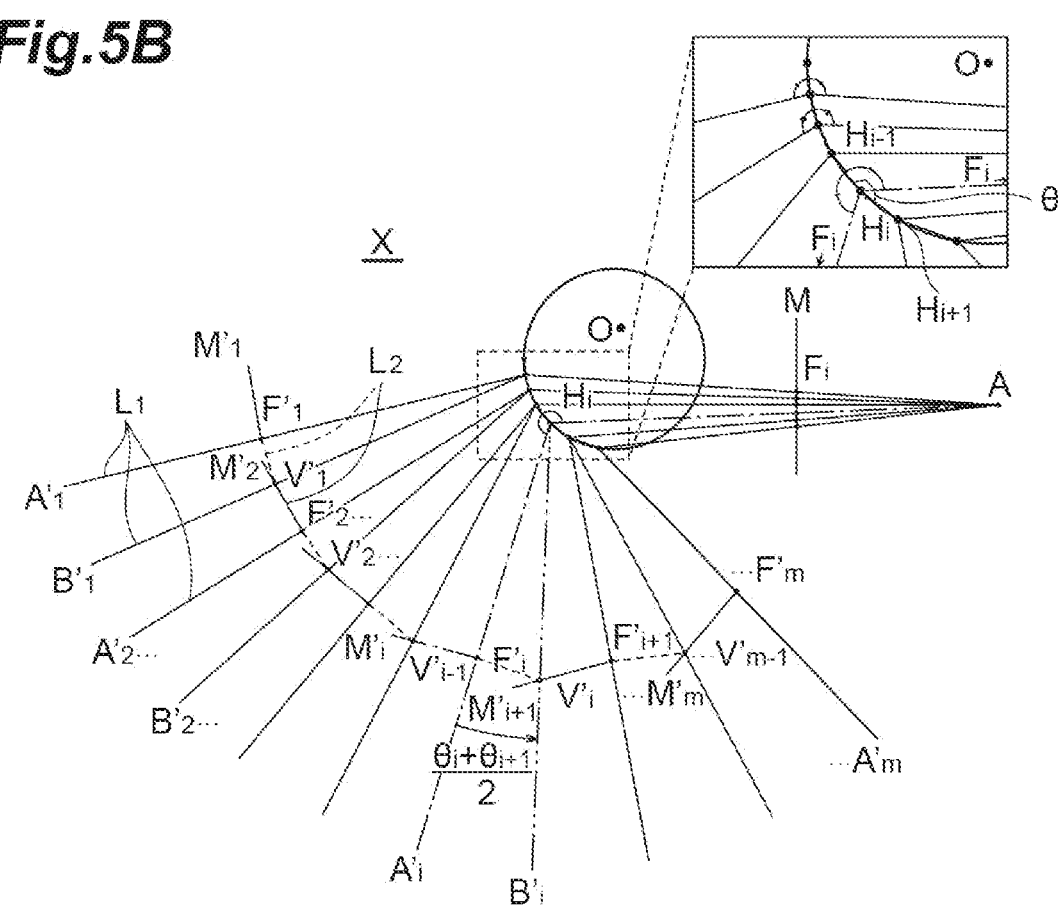

Next, as illustrated in FIG. 5B, a fold line $H_1A'_1$, which is obtained by arranging a line $H_1A$ to be line-symmetric with respect to a line segment $H_0H_1$ between adjacent starting points in the reference circle O serving as the ribbase, is drawn. Similarly, fold lines $H_2A'_2$ to $H_mA'_m$ obtained by arranging line segments $H_2A$ to $H_mA$ to be line-symmetric with respect to line segments $H_1H_2$ to $H_{m-1}H_m$. Here, the fold lines $H_1A'_1$ to $H_mA'_m$ become mountain fold lines when folding the sheet X.

Next, vertexes $F'_1$ to $F'_m$, which have the same distances as $F_1$ to $F_m$ with the starting points $H_1$ to $H_m$ set as a reference, are provided on the fold lines $H_1A'_1$ to $H_mA'_m$. The vertexes $F'_1$ to $F'_m$ are points serving as a design reference of the second fold lines. Furthermore, the vertexes $F'_1$ to $F'_m$ are set as starting points, and line segments $F'_1M'_1$ to $F'_mM'_m$ corresponding to line segments $F_1M$ to $F_mM$ are designed to be respectively line-symmetric with respect to line segments $H_{i-1}H_i$ corresponding to the respective points.

On the other hand, rotation is performed from the fold lines to $H_mA'_m$ by a predetermined angle with the starting points $H_1$ to $H_m$ set as a reference, thereby designing fold lines to $H_mB'_m$ which become valley fold lines. For example, the predetermined angle at this time is designed so that an angle between the fold line $HA'$, and the fold line $H_iB'_i$ is set to be $\pi-\Theta$ when $\angle H_{i-1}H_iH_{i+1}=\Theta_i$ is defined. In a case where the ribbase is a precise circle as the reference circle O, $\pi-\Theta$ becomes $(\theta_i+\theta_{i+1})/2$. According to this, a configuration corresponding to first fold lines $L_1$, in which a mountain fold line and a valley fold line are repeated alternately is, designed.

Here, intersection points between $H_iB'_i$ and $F'_{i+1}M'_{i+1}$ can be set as a vertex $V'_i$ ($V'_1$ to $V'_m$) in the fold line $H_iB'_i$. A Line passing through $F'_i$ and $V'_i$ corresponds to a second fold line that is a fold line in a direction intersecting to the mountain fold line and the valley fold line of the sheet X for which mountain fold and valley fold are repeated. That is, the design of the switching point $V'_i$ becomes important as design of the second fold line. That is, a continuous line of $F'_1$, $V'_1$, $F'_2$, $V'_2$, $F'_3$, $V'_3$, . . . , $F'_i$, $V'_i$, . . . correspond to a plurality of second fold lines, and a line segment $F'_1V'_1$, a line segment $V'_1F'_2$, . . . , a line segment $F'_{i-1}V'_{i-1}$, a line segment $V'_{i-1}F'_i$, . . . , and the like correspond to the second fold lines, respectively.

In the above-described design process, relationships of the following Mathematical Formulae (1) and (2) are established. This is also clear from FIG. 6.

$$\angle V'_{i-1}F'_iH_i = \angle V'_iF'_iH_i \qquad (1)$$

$$\angle F'_iV'_iH_i = \angle F'_{i+1}V'_iH_i \qquad (2)$$

Figure 6:
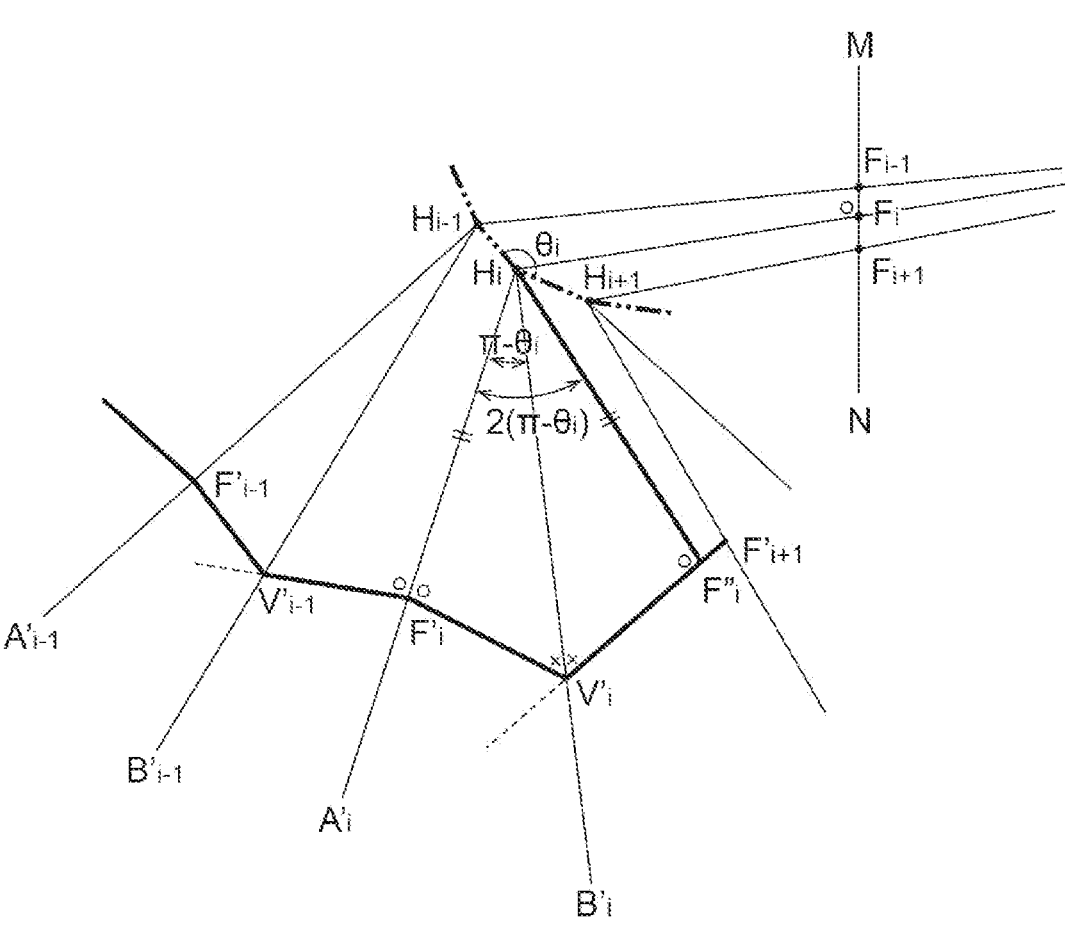
FIG. 6 is a view describing the example fold line design method.

A point $F''_i$ illustrated in FIG. 6 is obtained by arranging a point $F_i$ to be line-symmetric with respect to a line segment $H_iH_{i+1}$. At this time, $\theta_i$ is an angle between the line segment $H_{i-1}H_i$ and the line segment $H_iH_{i+1}$. Here, flat foldability around $H_i$ is satisfied (that is, in a case where a relationship of $\angle F'_iH_iV'_i = \pi-\theta_i$ is satisfied), $\Delta H_iV'_iF'_i$ and $\Delta H_iV'_iF''_i$ match each other. Accordingly, the relationships of Mathematical Formula (1) and Mathematical Formula (2) are satisfied. These equations also imply that flat foldability is satisfied around the vertexes. Note that, conditions for satisfying the above-described "flat foldability" are based on Kawasaki theorem (flatness condition theorem).

In step S05, the correction of the fold lines is performed with the vertex $F'_1$ set as a starting point. The vertex after correction is set as a point $F^*_1$ and $V^*_i$. In this case, a vertex $V^*_1$ after correction is plotted to an intersection point between a line obtained by rotating the line segment $V'_1F'_1$ around $F'_1$ by $\phi_1$, and a radial fold line $H_1B'_1$. In addition, in a state in which a line segment $V^*_1F^*_2$ is parallel to an original line segment $V'_1F'_2$, a vertex $F^*_2$ after correction is determined so that the vertex $F^*_2$ after correction is set to an intersection point with a line segment $H_2A'_2$. In addition, a vertex $V^*_2$ is determined with the vertex $F^*_2$ set as a reference in the above-described procedure (in addition, a rotation angle at this time is set to $\phi_2$). These steps are repeated to determine vertexes $F^*_i$ and $V^*_i$ which constitute the second fold line after correction. A set of line segments ( . . . , $F^*_{i-1}$, $V^*_{i-1}$, $F^*_i$, $V^*_i$, $F^*_{i+1}$, $V^*_{i+1}$, . . . ) alternately passing through vertexes $F^*_i$ and $V^*_i$ after correction in the order of $_i$ is set as a plurality of second fold lines $L'_2$ after correction.

In addition, in correspondence with the correction, among the first fold lines which are radial fold lines, a line segment $F'_iA'_i$ and a line segment $V'_iB'_i$ which are line segments on an outer side of intersection points with the second fold lines are drawn again with the vertex $F^*_i$ after correction and the vertex $V^*_i$ after correction set as a reference. That is, line segments $F^*_iA^*_i$ and $F^*_iB^*_i$ after correction are drawn to a position after rotation of original line segments $F'_iA'_i$ and $V'_iB'_i$ by an angle $\phi_i$. As a result, a first fold line $L'_1$ after correction becomes a fold line that is inclined with respect to a line segment on an inner side of a second fold line $L'_2$ after correction by an angle $\phi_i$ on an outer side of an intersection point with the second fold line $L'_2$ after correction.

As described above, design of the fold lines with respect to the sheet X is completed by correcting the first fold lines and the second fold lines.

Next, in the fold line design device 1, step S06 (adjustment step) is executed. In step S06, the adjustment unit 122 of the design unit 12 confirms whether the fold lines (the reference circle, the first fold lines, and the second fold lines) designed in steps S02 to S05 are appropriate for previous setting. Examples of a confirmation method include a method of confirming that which shape will be obtained, a crease appears in external appearance in which manner, and the like when actually folding a target member on the basis of the fold lines drawn in steps S02 to S05 through simulation. Note that, respective steps (S02 to S05) relating to the fold line design may be repeated again in accordance with a confirmation result. For example, since a positional relationship between the intersection points $F_1$ to $F_m$ set on the reference line MN and the ribbase has an influence on actual drawing of the fold lines, when adjusting a position of the reference line MN, a positional relationship between the reference point A and the ribbase for setting the intersection points $F_1$ to $F_m$, or the like, a shape after folding can be changed. Accordingly, a user of a device or a program may determine the design of the fold lines so that a folded shape and an external appearance of a target member after folding become desired shapes while performing adjustment in step S06.

Then, the fold line design device 1 executes step S07 (output step). In step S07, the output unit 13 outputs information relating to the fold lines (the reference circle, the first fold lines, and the second fold lines) designed through steps S02 to S06. In this manner, processing relating to the design of the fold lines is completed.

Figure 8C:
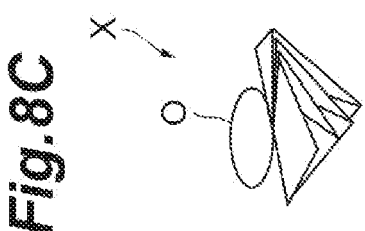
FIG. 8A to FIG. 8C are views describing an example folded body of a sheet along a fold line.
Figure 8B:
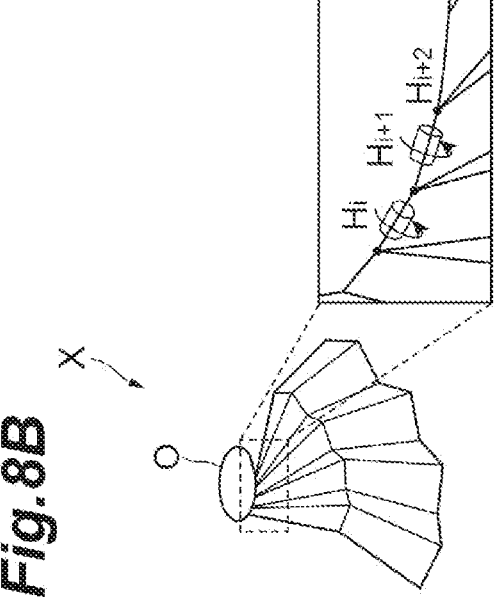
Figure 8A:
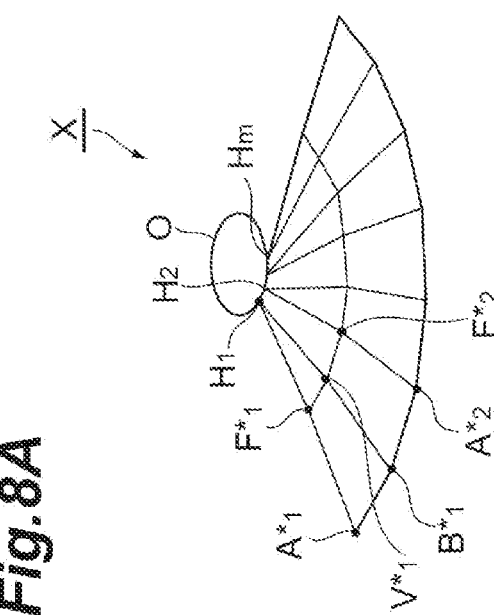

FIG. 8A to FIG. 8C illustrate an example method of folding the sheet X on the basis of the fold lines designed in the above-described procedure. It is assumed that the fold lines designed with respect to the sheet X in the above-described procedure are set as illustrated in FIG. 8A. Here, with regard to the first fold lines, the sheet X is folded so that a line segment $H_iF^*_iA^*_i$ is subjected to mountain fold and a line segment $H_iV^*_iB^*_i$ is subjected to valley fold, and with regard to the second fold lines, the sheet X is folded so that a line segment $F^*_iV^*_i$ is subjected to mountain fold and a line segment $V^*_iF^*_{i+1}$ is subjected to valley fold. At this time, as illustrated in FIG. 8B, at the periphery of the reference circle O, the line segments $H_iH_{i+1}$ become hinges, respectively, and outer sides of the reference circle rotate in the same direction with respect to the reference circle O, respectively. In the example illustrated in FIG. 8B, rotation is performed with the line segments $H_iH_{i+1}$ set as an axis so that an outer side (side in which the first fold lines and the second fold lines are provided) of the reference circle O faces downward. In this state, when performing folding along the first fold lines the second fold lines as described above, the sheet X can be folded as illustrated in FIG. 8C. At this time, the line segment $F^*_iV^*_i$, and the line segment $V^*_iF^*_{i+1}$, after correction which become the second fold lines enter a slightly deviating state in a folded state. Accordingly, it is possible to prevent a state in which the sheets cannot be folded due to interference between parts of the sheet X. In addition, since the sheet X can be folded in a state in which interference parts of the sheet X are suppressed, the sheet X can be folded in a more compact manner.

Note that, when designing the fold lines in the fold line design device 1, as described above, the ribbase O is set, and various fold lines such as the first fold lines are designed with the ribbase O set as a reference. However, the ribbase O is necessary for designing fold lines, but it is not essential that the fold lines exist in the sheet X on which the fold lines are designed. Accordingly, for example, the fold lines may be designed by virtually providing a region corresponding to the ribbase O on an outer side of the sheet X. In addition, designing of the fold lines may be performed while omitting a part of the ribbase O.

Note that, in the above-described example, the fold lines to $H_mA'_m$ are set as a mountain fold line at the time of folding the sheet X, and then the first fold lines and the second fold lines are designed. However, a folding direction (mountain fold and valley fold) of the fold lines can be appropriately changed. For example, the above-described fold lines $H_1A'_1$ to $H_mA'_m$ may be set as a valley fold line at the time of folding the sheet X, and folding directions may be substituted with each other with respect to mountain fold lines and valley fold lines designed in the subsequent procedure. In addition, a folding direction (mountain fold and valley fold) may be changed with respect to only a part of the fold lines designed on the sheet X. In this manner, the folding direction (mountain fold and valley fold) along the fold lines can be appropriately changed. How to change may be determined, for example, by using simulation in step S06 (adjustment step).

When designing fold lines in a developable structure with respect to an actual sheet X or the like on the basis of the fold line design method described in the above-described procedure, it is necessary to enhance foldability when folding the sheet X and it may be required to design the fold lines so that designed fold lines do not conflict with each other. For this, it is considered that some conditions are added to a part of parameters used in the above-described procedure. In FIG. 9A, FIG. 9B, FIG. 10A and FIG. 10B, description will be given of a variation of a folded shape in a case where conditions are added to the parameters.

Figure 7:
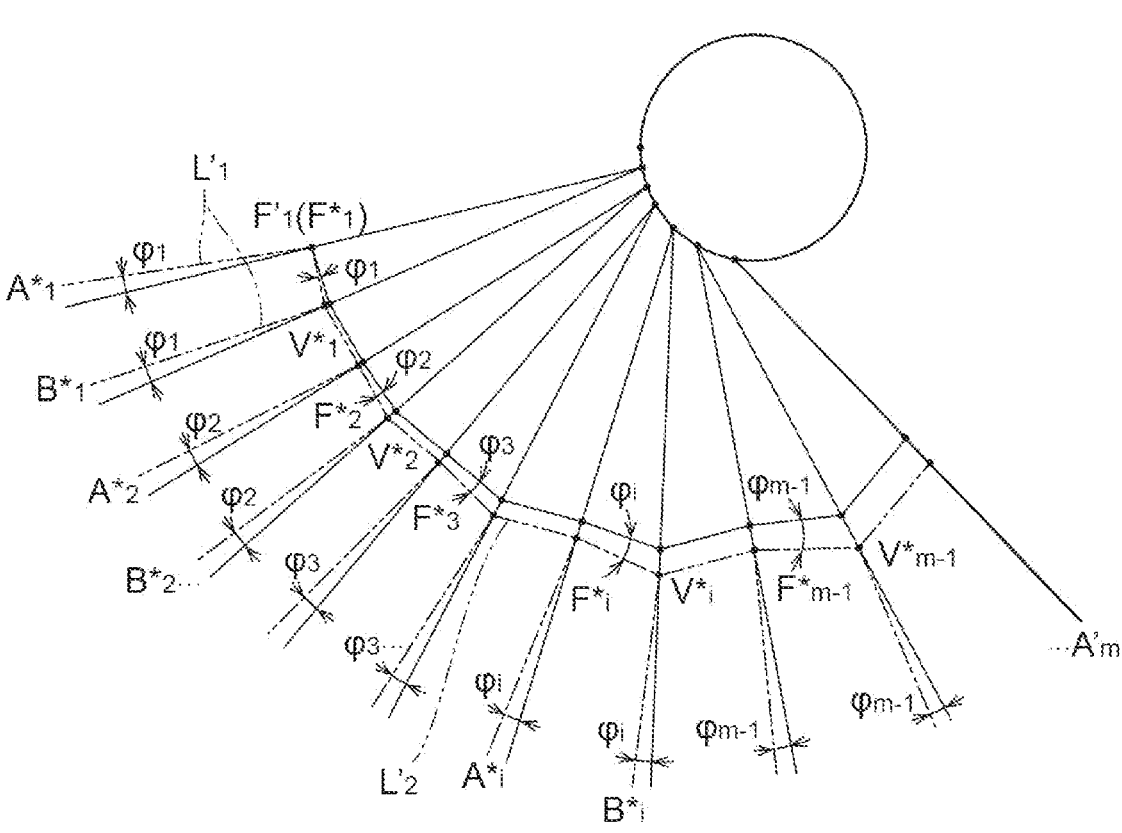
FIG. 7 is a view describing the example fold line design method.
Figures 9A, 9B:
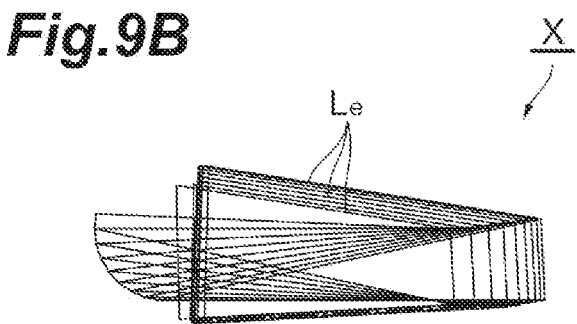
FIG. 9A and FIG. 9B describe an example folding shape in a case of adding conditions with respect to parameters.

FIG. 9A and FIG. 9B illustrate a first example. As illustrated in FIG. 9B, in the first example, when folding the sheet X along the second fold lines $L'_2$ after correction, facet edges $L_e$ of creases along first fold lines $L'_1$ on an outer side of second fold lines $L'_2$ are parallel to each other. To realize this shape, the rotation angle $\phi_i$ ($\phi_1$ to $\phi_m$) in correction in step S05 as illustrated in FIG. 7 is required to match an angle $\Phi_i$ ($\Phi_1$ to $\Phi_m$) of a line segment $AH_i$ with respect to the reference line MN as illustrated in an upper right drawing of FIG. 5A. In this configuration, folding can be performed so that the facet edges $L_e$ are parallel with each other as illustrated in FIG. 9B. In addition, in order for the plurality of facet edges $L_e$ of the creases to approach each other, for example, it is considered to shorten a distance between the reference point A and the reference line MN. Examples thereof include a design in which the reference point A is located on the reference line MN as illustrated in FIG. 9A. In this manner, it is possible to perform folding into a shape as illustrated in FIG. 9B by adjusting respective portions. Adjustment of an angle or the like of the respective portions may be performed by simulating a folded shape and by adjusting the fold lines on the basis of the result, for example, in step S06 (adjustment step).

Figure 10A:
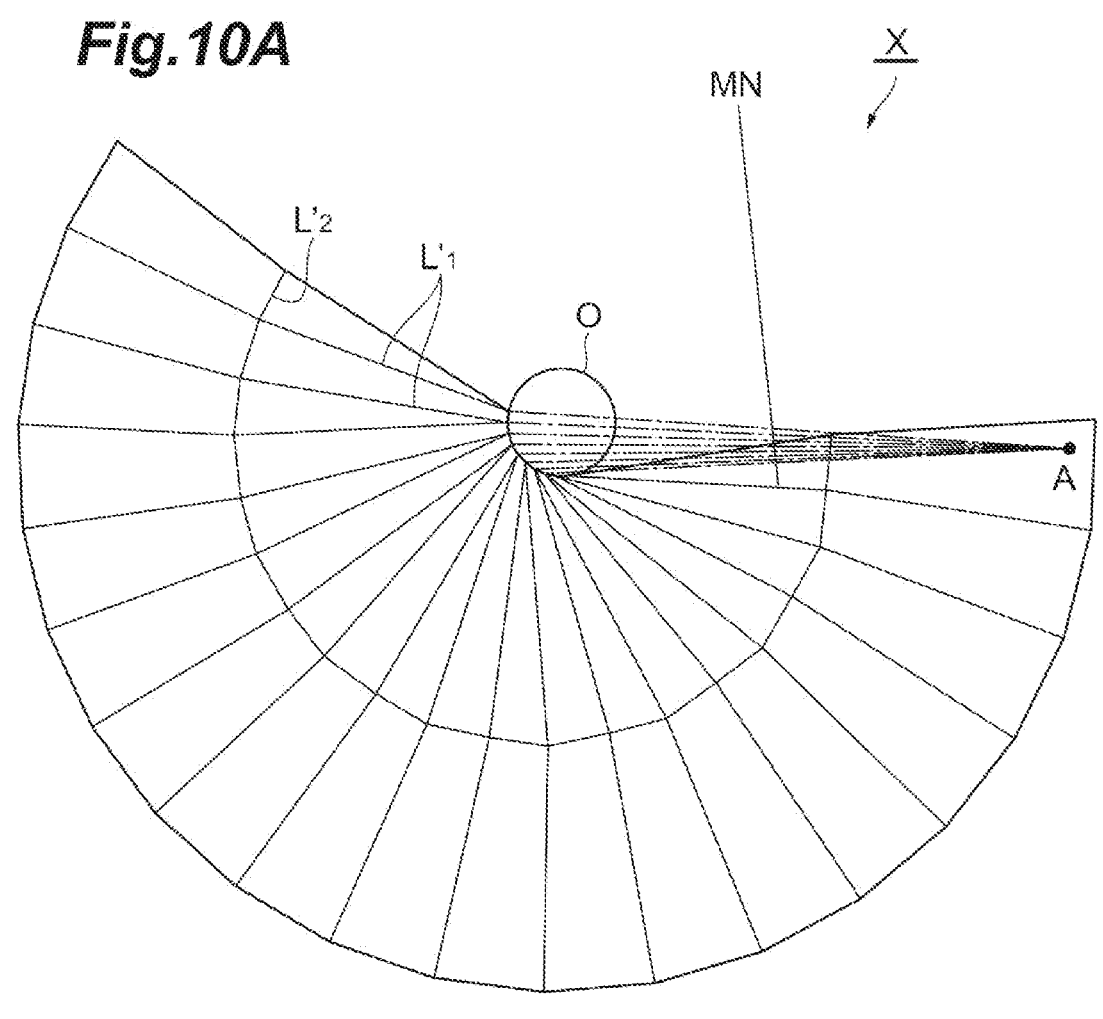
FIG. 10A and FIG. 10B describe another example folding shape in a case of adding conditions with respect to the parameters.
Figure 10B:
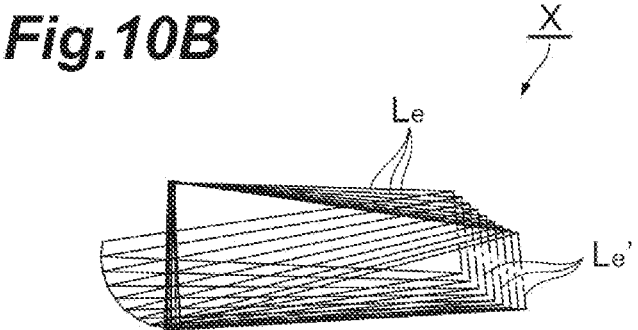

FIG. 10A and FIG. 10B illustrate a second example. As illustrated in FIG. 10B, in the second example, when folding the sheet X along the second fold lines $L'_2$ after correction, facet edges $L_e'$ of creases along the second fold line $L'_2$ are angled to be separated from each other at approximately the same interval. To realize this shape, it is required for the rotation angle $\phi_i$ ($\phi_1$ to $\phi_m$) in the correction in step S05 illustrated in FIG. 7 to be approximately the same. According to this, the facet edges $L_e'$ are located to deviate from each other, and as illustrated in FIG. 10B, folding can be performed while equalizing a clearance between the facet edges $L_e'$.

In the method illustrated in FIG. 9A and FIG. 9B, a material such as paper and a film having a substantially uniform thickness can be folded compactly. However, for example, in a case of umbrellas, tents, and the like in which a frame is provided along the first fold lines or between the first fold lines adjacent to each other, overlapping of frames may interfere folding. Therefore, as illustrated in FIG. 10A and FIG. 10B, a shape in which respective planes after folding deviate slightly is also considered. In this manner, with regard to the above-described fold lines, a shape and a characteristic in folding little by little can be changed by changing various parameters. Adjustment of the parameters may be performed by simulating a folded shape and by adjusting fold lines on the basis of the result, for example, in step S06 (adjustment step).

A configuration in which positions of the second fold lines (accurately, the second fold lines after correction) are deviated so as not to overlap each other in a plan view (in a case of viewing from an upper surface an overlapping state of main surfaces of the sheet X when being folded) is realized by the above-described various procedures. As a method of setting the fold lines for compactly folding the sheet X without floating of a part of the sheet X while deviating the second fold lines, it is considered that the above-described fold line design method is effective. On the other hand, even in a case where at least parts of the second fold lines (accurately, the second fold lines after correction) when folding the sheet X overlap each other in a plan view, the sheet X can be folded compactly to a certain extent, and thus the design of the fold lines is effective in this regard. For example, in a case where the sheet X that is a target member is composed of a very thin and flexible material, even when the amount of deviation between the second fold lines when folding the sheet X is remarkably small in a plan view, the sheet X can be folded compactly. In addition, in a case of the material, even when the second fold lines overlap each other in a plan view, compact folding can be performed.

In the above-described examples, description has been given of a case of folding a so-called fan-shaped sheet. In contrast, FIG. 11A to FIG. 11D, FIG. 12A to FIG. 12D and FIG. 13A to FIG. 13E illustrate an example of folding a sheet having a shape different from the above-described sheet shape.

Figures 11A, 11B, 11C, 11D:
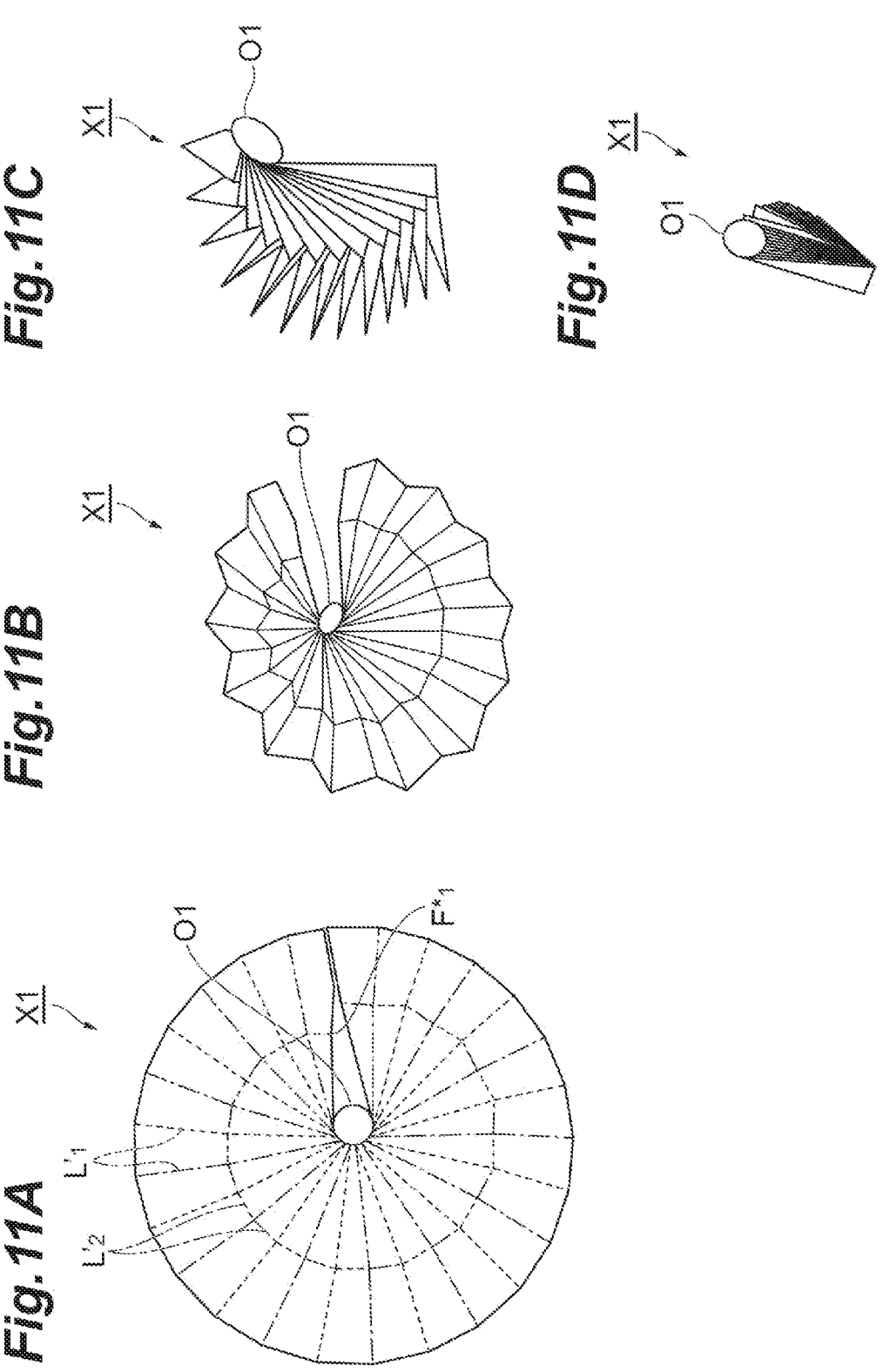
FIG. 11A to FIG. 11D are views describing another example of sheet folding.

FIG. 11A to FIG. 11D illustrate a folding example in a case of folding a sheet X1 having a fan shape with a central angle of approximately 360°. In a case of the sheet X1 having the shape, for example, a reference circle O1 serving as the ribbase is set to a position slightly deviated from the center of an approximately circular main surface, and the first fold lines $L'_1$ and the second fold lines $L'_2$ can be designed by the above-described method. Even in a case of the example illustrated in FIG. 11A to FIG. 11D, the sheet X1 can be folded compactly as in the example illustrated in FIG. 8A to FIG. 8C. Note that, as illustrated in FIG. 11A, the second fold lines $L'_2$ have a shape that gradually faces an outer periphery as being distant from a starting point $F^*_1$ by performing the above-described correction. A position of the reference line MN may be determined in consideration of this point.

FIG. 12A to FIG. 12D illustrate a folding example in a case of folding a sheet X2 having an approximately circular shape in which semi-circular sheets are combined to be symmetric with each other. In a case of the sheet X2 having the shape, for example, a shape having the same circular portion as in the reference circle O1 and a rectangular portion extending outward from the circular portion is defined as the ribbase. In addition, the radial first fold lines $L'_1$ are defined as a radial shape by setting an outer peripheral portion of the circular portion as a starting point, and the second fold lines $L'_2$ are defined in correspondence with the definition. In addition, fold lines $L_3$ which are continuous to second fold lines $L'_2$ are also set to a ribbase O2. As a result, as illustrated in FIG. 12B and FIG. 12C, the ribbase O2 can also be folded when performing folding along the second fold lines $L'_2$. As a result, compact folding can be performed as illustrated in FIG. 12D.

FIG. 13A to FIG. 13E illustrate a folding example in a case of folding a sheet X3 in which semi-circular sheet portions $X3_1$ and $X3_2$ are connected to each other differently from the sheets X1 and X2. In a case of the sheet X3 having the shape, it is assumed that ribbases $O3_1$ and $O3_2$ with a shape having a circular portion and a rectangular portion extending outward from the circular portion are defined with respect to each of the sheet portions $X3_1$ and $X3_2$ as in the sheet X2, and a ribbase O3 is obtained by connecting these ribbases. In addition, on the basis of each of the ribbases $O3_1$ and $O3_2$, the radial first fold lines $L'_1$ are defined as a radial shape by setting an outer peripheral portion of the circular portion as a starting point, and the second fold lines $L'_2$ are defined in correspondence with the definition. In addition, fold lines $L_3$ continuous to the second fold lines $L'_2$ are also set to the ribbase O3. As a result, as illustrated in FIG. 13B and FIG. 13C, in each of the sheet portions $X3_1$ and $X3_2$, first, folding along the first fold lines $L'_1$ and the second fold lines $L'_2$ is performed. In addition, as illustrated in FIG. 13C and FIG. 13D, the ribbases $O3_1$ and $O3_2$ can also be folded along the fold lines $L_3$. As a result, compact folding can be performed as illustrated in FIG. 13E.

Figure 14:
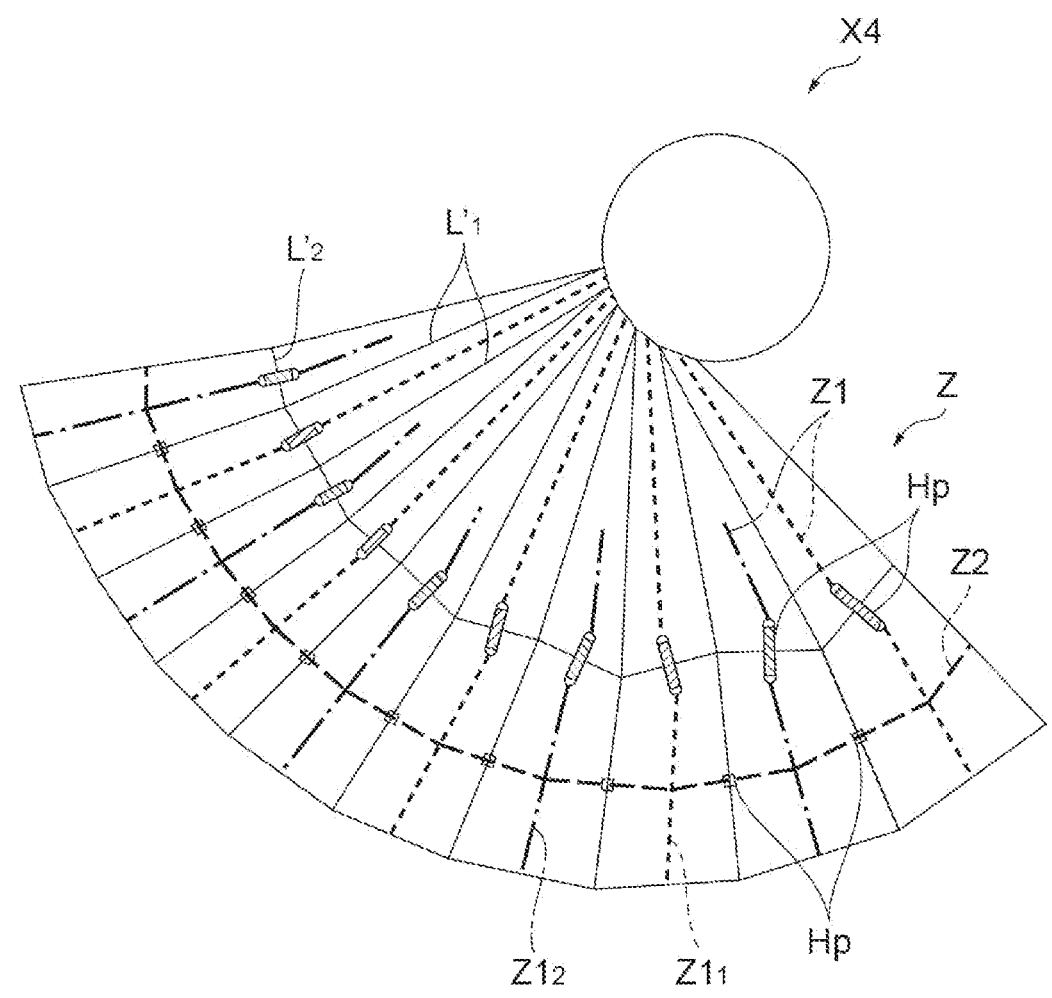
FIG. 14 is a view describing an example in which a folding method is applied to a member (frame) having another shape.

FIG. 14 illustrates an application example in a case where a target member is constituted by only a framework instead of a sheet. Examples of the target member that is constituted by only the framework include a member for which folding is assumed as in a framework of an umbrella. In a case of designing the framework for which the folding is required, when designing fold lines as illustrated in FIG. 14, a sheet X4 covering arrangement of the framework is set as a fold line design target, and the first fold lines $L'_1$ and the second fold lines $L'_2$ are designed in the above-described procedure. In addition, as the framework Z, a framework group Z1 passing between the first fold lines $L'_1$ adjacent to each other, and a framework group Z2 provided to intersect the framework group Z1 on an outer side of the second fold lines $L'_2$ (on an outer side of the second fold lines $L'_2$ with respect to the framework group Z1 extending radially from the reference circle O) are set. The framework group Z1 is provided radially with respect to the reference circle O so as to extend between the first fold lines $L'_1$ adjacent to each other. A hinge is provided for a framework at a position where each framework intersects fold lines designed on the basis of a sheet X4. For example, each framework included in the framework group Z1 is provided with a hinge Hp capable of bending the framework at each intersection position to intersect each of the second fold lines $L'_2$. The hinge Hp becomes a folding position when folding the framework on the basis of the fold lines. In FIG. 14, the framework group Z1 includes a first group $Z1_1$ and a second group $Z1_2$, but a bending method is different between a hinge Hp provided at an intersection point with the second fold lines $L'_2$ in frameworks of the first group $Z1_1$, and a hinge Hp provided at an intersection point with the second fold lines $L'_2$ in frameworks of the second group $Z1_2$. The folding method depends on whether the second fold line $L'_2$ at each position is a mountain fold line or a valley fold line. In addition, the hinge Hp is also provided for the framework group Z2 at an intersection point with the first fold lines $L'_1$.

In this manner, after designing fold lines on the assumption of the sheet X4, when designing a framework so that a hinge corresponding to a folding direction is provided at a position corresponding to the fold lines, it is possible to design frameworks capable being folded as in the sheet. In a case where a target member is a member different from a sheet, as in the framework Z illustrated in FIG. 14, after designing fold lines as in a case where the target member is a sheet, by providing a hinge so that the target member can be folded at a folding position, it is possible to realize a configuration in which compact folding is possible as in the above-described sheet. Note that, in a case where the framework group Z1 illustrated in FIG. 14 is connected to the ribbase O, the hinge may also be provided in the connection portion. In this manner, a position where the hinge is provided can be appropriately changed in correspondence with a shape of a framework structure.

Figures 15A, 15B, 15C, 15D:
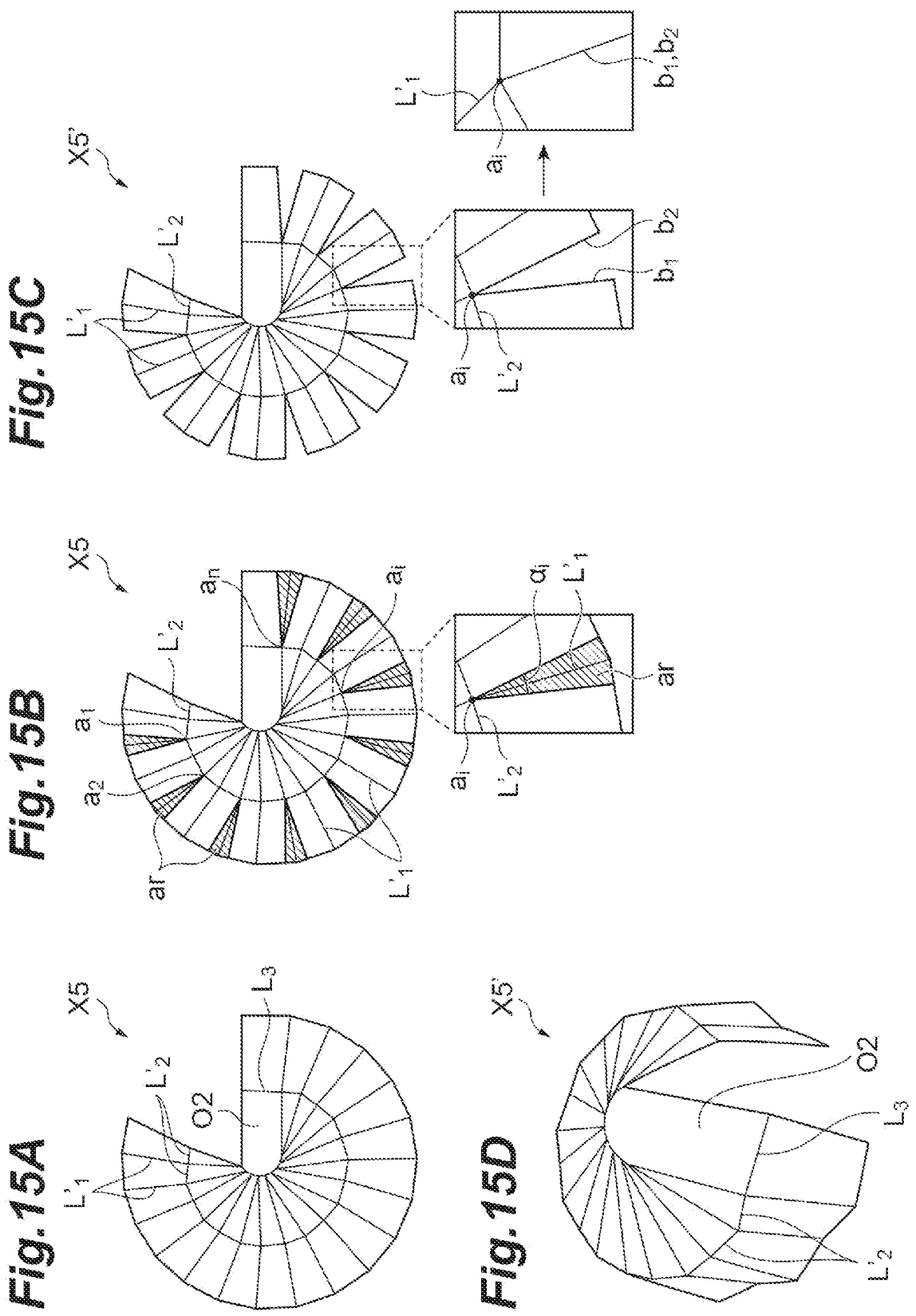
FIG. 15A to FIG. 15D are views describing an example in which the folding method is applied to a member (three-dimensional body) having another shape.

FIG. 15A to FIG. 15D illustrate a sheet X5' modified from a planar sheet X5 designed by using the method described in some examples so as to satisfy conditions in which a three-dimensional shape can be formed and folding is possible. The sheet X5' is a sheet capable of forming a dome shape as the three-dimensional shape. FIG. 15A to FIG. 15C are views illustrating an example procedure of forming the sheet X5' from the sheet X5, and FIG. 15D is a schematic view illustrating an example state in which the dome shape is formed from the sheet X5'.

The sheet X5 illustrated in FIG. 15A is an example of a sheet in which a ribbase O2 (and fold lines $L_3$ on the ribbase O2) is provided as in the sheet X2. With respect to the sheet X5, every other vertex on the second fold lines $L'_2$ is selected. For example, as illustrated in FIG. 15B, points $a_1$, $a_2$, $a_3$, . . . , and $a_n$ are selected. Next, a region ar corresponding to an angle α is cut out with the first fold lines $L'_1$ passing through the selected points $a_i$ to $a_n$ set as a reference (for example, as a center). An angle $\alpha_i$ of a cut-out region ar with an $i^{th}$ point $a_i$ set as a reference may be determined for each of the points $a_1$ to $a_n$, but may be set to be uniform. When setting the region ar in FIG. 15B, in a case of setting the region ar so that the first fold line $L'_1$ passing through the point a, forms the center of the region ar (the first fold line $L'_1$ bisects the angle $\alpha_1$), it is possible to satisfy conditions capable of realizing folding of the sheet $X5'$, for example, as in the state of the sheet $X2$ in FIG. 12D.

When cutting out the region ar, as illustrated in FIG. 15C, two edges $b_1$ and $b_2$ in which each of the points $a_1$ to $a_n$ is set as a starting point are formed. According to this, the sheet $X5'$ is formed. When joining the two edges $b_1$ and $b_2$ in which each of the points $a_1$ to $a_n$ is set as a starting point to each other, as illustrated in FIG. 15D, it is possible to form a three-dimensional shape in a shape in which an outer peripheral portion of the second fold lines $U_2$ becomes a side wall of a dome.

The sheet $X5'$ can form the three-dimensional shape as illustrated in FIG. 15D, and as described above, in a case where the region ar is set so that the first fold line $L'_1$ passing through the point a, forms the center of the region ar, after folding, compact folding as illustrated in FIG. 12D can be performed. Note that, in the example illustrated in FIG. 15A to FIG. 15D, as the points $a_1$ to $a_n$, every other vertex on the second fold lines $L'_2$ is selected, but a modification can be made to, for example, every third vertex or the like. In this case, a shape after folding can be changed. In addition, as the points $a_1$ to $a_n$, all vertexes can also be selected.

Note that, in the example illustrated in FIG. 15A to FIG. 15D, after cutting out the region ar corresponding to the angle $\alpha$ (refer to FIG. 15B), the two edges $b_1$ and $b_2$ are joined to each other to form the three-dimensional shape. Description has been given of a case of forming the three-dimensional shape by setting the angle around the vertexes (points $a_l$ to $a_n$) to be less than 360°. However, a method of forming the three-dimensional shape is not limited to the above-described method, and for example, the angle around the vertexes (points $a_1$ to $a_n$) may be set to a state different from 360°. Accordingly, as illustrated in FIG. 15B, a three-dimensional shape can be configured by creating a shape in which the angle around the vertexes (points $a_1$ to $a_n$) is greater than 360° by adding (for example, stacking) a piece of paper having a shape corresponding to the region ar corresponding to the angle a to the periphery of the vertexes (points $a_1$ to $a_n$).

As described in some examples, a fold line design method is a method of designing a fold line for folding a target member. The method includes: setting a ribbase (a reference circle O as an example) on a plane along a main surface of the member; designing a plurality of first fold lines each of which extend radially from the ribbase as a starting point, and in which a mountain fold line and a valley fold line are alternately disposed; and designing a plurality of second fold lines which respectively connect the first fold lines adjacent to each other among the plurality of first fold lines, and constitute one continuous fold line.

As described in some examples, a design device is a design device configured to design a fold line for folding a target member. The design device includes: a shape information acquisition unit configured to acquire information relating to a shape of the target member; a design unit configured to design the fold line on the basis of the information acquired by the shape information acquisition unit; and an output unit configured to output a result designed by the design unit. The design unit sets a ribbase on a plane along a main surface of the target member, designs a plurality of first fold lines each of which extend radially from the ribbase as a starting point, and in which a mountain fold line and a valley fold line are alternately disposed, and designs a plurality of second fold lines which respectively connect the first fold lines adjacent to each other among the plurality of first fold lines, and constitute one continuous fold line.

As described in some examples, a design program is a design program causing a computer to function as a design device configured to design a fold line for folding a target member. The design program has: a shape information acquisition function of acquiring information relating to a shape of the target member; a design function of designing the fold line on the basis of the information acquired by the shape information acquisition function; and an output function of outputting a result designed by the design function. The design function includes: setting a ribbase on a plane along a main surface of the target member, designing a plurality of first fold lines each of which extend radially from the ribbase as a starting point, and in which a mountain fold line and a valley fold line are alternately disposed, and designing a plurality of second fold lines which respectively connect the first fold lines adjacent to each other among the plurality of first fold lines, and constitute one continuous fold line.

According to the fold line design device, the design method, and the design program, a plurality of first fold lines each of which extend radially from the ribbase as a starting point, and in which a mountain fold line and a valley fold line are alternately disposed, and a plurality of second fold lines which respectively connect the first fold lines adjacent to each other among the plurality of first fold lines, and constitute one continuous fold line are designed. When this configuration is provided, the target member can be folded in a more compact manner.

In some examples, since it is possible to shorten a length in a longitudinal direction (direction along the first fold lines) by using the second fold lines, compact folding can be realized.

The plurality of first fold lines may include a plurality of mountain fold lines ($H_iA'_i$) that extend radially from different starting points on the ribbase, and a plurality of valley fold lines ($H_iB'_i$) which that radially between the mountain fold lines adjacent to each other from the starting points of the plurality of mountain fold lines. According to this structure, since a rotation axis with respect to a ribbase can be set between starting points of a plurality of mountain fold lines, a target member having a fan shape can be compactly fold without increasing the thickness.

In designing of the plurality of first fold lines and in designing of the plurality of second fold lines, a reference line provided on an outer side of the ribbase may be set, and with respect to each straight line extending from the starting point of each of the plurality of mountain fold lines toward the reference line, an intersection point with the reference line may be set for each of the starting points, and design may be performed by using a straight line connecting the starting point and the intersection point of the reference line. When designing the first fold lines and the second fold lines in the above-described procedure, it is possible to draw fold lines suitable for compact folding of a target member.

Designing of the plurality of first fold lines may include drawing of a straight line connecting each of the starting points of the plurality of mountain fold lines on the ribbase and a reference point provided on an outer side of the ribbase, and drawing a fold line obtained by arranging the straight line to be line-symmetric with respect to a line connecting the starting point and an additional starting point adjacent to the starting point, and designing of the plurality of second fold lines may include setting of a reference line between the ribbase and the reference point, and setting of intersection points between the second fold lines and the plurality of mountain fold lines on the basis of a distance between each starting point of the straight line on the ribbase and an intersection point between the reference line and the straight line. When designing the first fold lines and the second fold lines in the above-described procedure, the plurality of second fold lines constituting one continuous fold line can be designed in a simple manner. That is, the second fold lines can be drawn without performing complicated calculation or the like.

Designing of the plurality of second fold lines may include designing of the plurality of second fold lines so that in each of the plurality of mountain fold lines included in the plurality of first fold lines, an angle made by two pieces of the second fold lines connected to the mountain fold line is equal in each case, and in each of the plurality of valley fold lines included in the plurality of first fold lines, an angle made by two pieces of the second fold lines connected to the valley fold line is equal in each case, and correcting the plurality of second fold lines so that a rotation axis of the target member when being folded becomes different between the plurality of the second fold lines after designing of the plurality of second fold lines, and in correspondence with the correction, correcting fold lines on a side far away from the ribbase in comparison to intersection points with the second fold lines in the plurality of first fold lines. When correcting the first fold lines and the second fold lines in the above-described procedure, positions of the plurality of second fold lines when folding a target member can deviate from each other so that the plurality of second fold lines do not overlap each other in a plan view, and more compact folding is possible.

The plurality of first fold lines after correction may be folded in the same direction on a side far away from the ribbase in comparison to intersection points with the second fold lines. According to this configuration, positions of the plurality of second fold lines when folding a target member deviate from each other so that the plurality of second fold lines do not overlap each other in a plan view, and it is possible to design a folded shape that is neat in appearance.

Note that, as illustrated in FIG. 9A and FIG. 9B, the plurality of first fold lines may be corrected so that facet edges of creases along the plurality of first fold lines are parallel to each other on a side far away from the ribbase in comparison to the second fold lines. In addition, as illustrated in FIG. 10A and FIG. 10B, the plurality of first fold lines on a side far away from the ribbase in comparison to the second fold lines may be corrected so that facet edges of creases along the second fold line are angled to be separated from each other at approximately the same interval.

It is to be understood that not all aspects, advantages and features described herein may necessarily be achieved by, or included in, any one particular example. Indeed, having described and illustrated various examples herein, it should be apparent that other examples may be modified in arrangement and detail.

For example, the detailed procedure of the fold line design method described above is illustrative only, and various modification can be made. For example, the shape of the ribbase, and the design procedure of the plurality of first fold lines and the plurality of second fold lines are not limited to the above-described examples.

In addition, in the above-described examples, description has been given of a procedure of correcting the first fold lines and the second fold lines (S05) after designing the first fold lines and the second fold lines at once (S03 and S04), but there is no limitation to the procedure. For example, it is possible to employ a configuration and a program of designing "fold line after correction" illustrated in FIG. 7 from the beginning In addition, correction (S05) of the first fold lines and the second fold lines may be omitted. Even in this case, the sheet-shaped member can be compactly folded by using the first fold lines and the second fold lines before correction. In addition, adjustment (S06) by simulation or the like after designing the fold lines once may be omitted.

In addition, the fold line design device 1 and the design program described in some examples can be appropriately modified. For example, in the fold line design device 1 and the design program, a function of automatically designing an angle of the fold lines, or the like may be provided, and a user may designate the angle or the like.

We claim all modifications and variations coming within the spirit and scope of the subject matter claimed herein.

I claim:

1. A method of designing a fold line for folding a target member, comprising:

setting a ribbase on a plane along a main surface of the target member;

designing a plurality of first fold lines each of which extend radially from the ribbase as a starting point, and in which a mountain fold line and a valley fold line are alternately disposed;

designing a plurality of second fold lines which respectively connect the first fold lines adjacent to each other among the plurality of first fold lines, and constitute one continuous fold line;

correcting the plurality of second fold lines so that a rotation axis of the target member when being folded becomes different between the plurality of the second fold lines after designing of the plurality of second fold lines; and in correspondence with the correction, correcting fold lines on a side far away from the ribbase in comparison to intersection points with the second fold lines in each of the plurality of first fold lines.

2. The method of designing a fold line according to claim 1, wherein the plurality of first fold lines includes a plurality of mountain fold lines that extend radially from different starting points on the ribbase, and a plurality of valley fold lines that extend radially between the mountain fold lines adjacent to each other from the starting points of the plurality of mountain fold lines.

3. The method of designing a fold line according to claim 1, wherein in designing of the plurality of first fold lines and in designing of the plurality of second fold lines, a reference line provided on an outer side of the ribbase is set, and with respect to each straight line extending from the starting point of each of the plurality of mountain fold lines toward the reference line, an intersection point with the reference line is set for each of the starting points, and design is performed by using a straight line connecting the starting point and the intersection point of the reference line.

4. The method of designing a fold line according to claim 2, wherein designing of the plurality of first fold lines includes drawing of a straight line connecting each of the starting points of the plurality of mountain fold lines on the ribbase and a reference point provided on an outer side of the ribbase, and drawing a fold line obtained by arranging the straight line to be line-symmetric with respect to a line connecting the starting point and an additional starting point adjacent to the starting point, and wherein designing of the plurality of second fold lines includes setting of a reference line between the ribbase and the reference point, and setting of intersection points between the second fold lines and the plurality of mountain fold lines on the basis of a distance between each starting point of the straight line on the ribbase and an intersection point between the reference line and the straight line.

5. The method of designing a fold line according to claim 1, wherein designing of the plurality of second fold lines includes designing of the plurality of second fold lines so that in each of the plurality of mountain fold lines included in the plurality of first fold lines, an angle made by two pieces of the second fold lines connected to the mountain fold line is equal in each case, and in each of the plurality of valley fold lines included in the plurality of first fold lines, an angle made by two pieces of the second fold lines connected to the valley fold line is equal in each case.

6. The method of designing a fold line according to claim 5, wherein after folding, the plurality of first fold lines are corrected so that facet edges of creases along the plurality of first fold lines are parallel to each other on a side far away from the ribbase in comparison to the second fold lines.

7. The method of designing a fold line according to claim 5, wherein after folding, the plurality of first fold lines on a side far away from the ribbase in comparison to the second fold lines are corrected so that facet edges of creases along the plurality of second fold lines are angled to be separated from each other at approximately the same interval.

8. A design device configured to design a fold line for folding a target member, comprising:

an input device unit configured to input information relating to a shape of the target member;

at least one processor configured to design the fold line on the basis of the information inputted by the input device; and an output device configured to output a result designed by the at least one processor, wherein the at least one processor is configured to:

set a ribbase on a plane along a main surface of the target member, design a plurality of first fold lines each of which extend radially from the ribbase as a starting point, and in which a mountain fold line and a valley fold line are alternately disposed, design a plurality of second fold lines which respectively connect the first fold lines adjacent to each other among the plurality of first fold lines, and constitute one continuous fold line, correct the plurality of second fold lines so that a rotation axis of the target member when being folded becomes different between the plurality of the second fold lines after designing of the plurality of second fold lines, and in correspondence with the correction, correct fold lines on a side far away from the ribbase in comparison to intersection points with the second fold lines in each of the plurality of first fold lines.

9. A non-transitory computer readable medium storing a design program causing a computer to function as a design device configured to design a fold line for folding a target member, comprising:

a shape information acquisition function of acquiring information relating to a shape of the target member;

a design function of designing the fold line on the basis of the information acquired by the shape information acquisition function; and an output function of outputting a result designed by the design function, wherein the design function performs setting a ribbase on a plane along a main surface of the target member, designing a plurality of first fold lines each of which extend radially from the ribbase as a starting point, and in which a mountain fold line and a valley fold line are alternately disposed, designing a plurality of second fold lines which respectively connect the first fold lines adjacent to each other among the plurality of first fold lines, and constitute one continuous fold line, correcting the plurality of second fold lines so that a rotation axis of the target member when being folded becomes different between the plurality of the second fold lines after designing of the plurality of second fold lines, and in correspondence with the correction, correcting fold lines on a side far away from the ribbase in comparison to intersection points with the second fold lines in each of the plurality of first fold lines.

\* \* \* \* \*